No. 670,802. Patented Mar. 26, 1901.
J. J. McCOURT.
STOCK WATERING TROUGH.
(Application filed July 27, 1900.)
(No Model.)
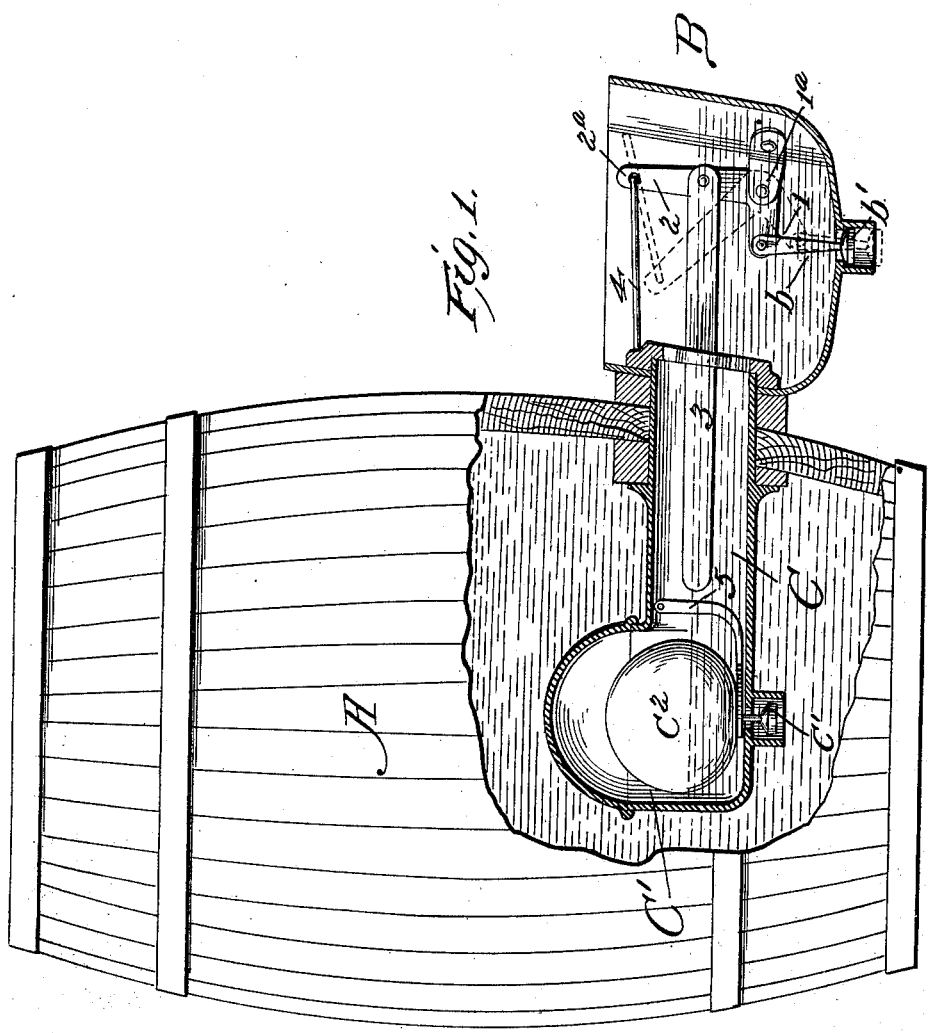
Attest
Ella L. Giles
Inventor
John J. McCourt
by Richardson
Attys
THE NORRIS PETERS CO., PHOTO-LITHO., WASHINGTON, D. C.

UNITED STATES PATENT OFFICE.

JOHN J. McCOURT, OF OAKLAND, NEBRASKA.

STOCK-WATERING TROUGH.

SPECIFICATION forming part of Letters Patent No. 670,802, dated March 26, 1901.

Application filed July 27, 1900. Serial No. 25,041. (No model.)

*To all whom it may concern:*

Be it known that I, JOHN J. McCOURT, a citizen of the United States, residing at Oakland, Burt county, Nebraska, have invented new and useful Improvements in Stock-Watering Troughs, of which the following is a specification.

My invention relates to improvements in stock-watering troughs.

The objects of the invention are to provide in a trough convenient for animals to drink from a constant supply of water, the supply in the trough being replenished from a storage-reservoir or the like, as is convenient, and to provide a means of draining the trough and automatic valve at any and all times for the purpose of cleaning the trough, repairing the mechanism, or avoiding the freezing of water in the trough and valve, and also to shut off the water-supply in the trough when not desired.

The invention is illustrated in the accompanying drawing, in which the figure is a central vertical section through a supply reservoir and trough.

In the drawing, A represents a barrel for supplying water to the trough, which, it will be understood, is representative of any suitable and convenient source of supply, while B represents the trough, of convenient size and shape. A pipe C connects the trough with the supply vessel, said pipe terminating at its inner end in a float-chamber C', having an inlet-port controlled by a valve c', operated by the float C² in the well-known manner.

In the center of the bottom of the trough B is a round opening b of sufficient diameter to admit of the free passage of sand and small gravel and other small substances. From the bottom upward is fitted into this opening a valve b', which seats upon the under side of the trough, completely closing the opening when desired. The valve is attached by a short rod 1 and hinged joint to an L-shaped lever 2 in the trough, which is in turn hinged to a lug 1ª, projecting into the trough from the front or outer side of the trough, the hinging being at the angle of the lever, so as to extend the transverse part of the lever into the center of the trough in line with the valve and opening. From the angle or pivot the lever extends perpendicularly to nearly the level of the top of the trough, as indicated at 2ª. The lever is preferably of flat metal and may vary in width and thickness to meet the requirements of the system with which it is connected and may be varied in form for use in differently-constructed troughs. For the purpose of securing the lever either at one side or the other of the trough in the operation of the device a locking-bar 4 is hinged to the top of the L-shaped lever in such a manner that it may be swung completely over. At a point about midway of the perpendicular section of the L-shaped lever is attached a bar of metal 3, of suitable width and thickness, and of sufficient length to reach back into the tank to a point near to and just in front of the float. The float may be of any design, but for illustration is a globular air-chamber of light material, to which is rigidly affixed the valve for closing the opening in the bottom of the float-chamber, the opening being the one through which the water passes from the storage-tank or main into the watering apparatus. Hinged in the valve-chamber is a metal "lift" 5, bent at right angles, with the transverse portion forked to pass under the float and beyond the center of said float. The lift is hinged at the top of the valve-chamber in such a manner that by forcing the free end of the metal bar which extends to near the float against it the float will be lifted and the valve forced into position to close the opening in the bottom of the float-chamber. This is accomplished by moving the top or free end of the L-shaped lever toward the float, which at the same time opens the valve in the bottom of the trough to permit the passage of the contents of the trough, as well as the water intermediate between it and the opening in the bottom of the valve-chamber. This process is reversed by pulling back the L-shaped lever until it closes the valve in the bottom of the trough, when water again flows to fill the trough until stopped by the automatic action of the float in the float-chamber, the float being lifted with the rising of the level of the water in the chamber. The L-shaped lever is held in position either toward the float to close the opening in the bottom of the float-chamber or away from it to close the opening in the bottom of the trough by means of the locking-bar 4, hinged to the top of the lever 2, which swings to the one side or the other and rests the free end against the side of the trough.

Having thus described my invention, what I claim is—

1. In a stock-watering apparatus, the combination with a water-supply, of a trough connected therewith, an automatic valve maintaining normally a constant water-level in said trough, a normally-closed valve controlling a drainage-opening from said trough, and means for opening said drainage-valve and positively and simultaneously closing said automatic valve, substantially as described.

2. In a watering apparatus, the combination with a water-supply, of a trough connected therewith, an automatic valve controlling the flow of water through said connection to maintain the water-level in the trough, a normally-closed valve controlling a drainage-opening in the bottom of trough, a lever for operating said valve, a valve-lifter for positively closing said automatic valve, and means whereby the movement of said operating-lever operates said automatic valve-lifter, substantially as described.

3. In a watering apparatus, the combination with a water-supply, of a trough connected therewith, an automatic valve controlling the flow of water through said connection, a valve controlling a drainage-opening in said trough, an operating-lever for said valve, locking means for holding said lever with the valve in either an open or closed position, a positive operating device for closing the automatic valve, and means whereby the opening of the drainage-valve operates said positive closing means for the automatic valve, substantially as described.

4. In a watering apparatus the combination with the supply vessel, of a trough, a pipe extending therefrom to the supply vessel and having a float-chamber, a float therein having a valve controlling an opening to said float-chamber a lifting device in said float-chamber, a valve controlling a drainage-opening in said trough, a bell-crank lever having one arm connected to said drainage-valve and the other extending upward in said tank, a rod connected with said bell-crank lever and extending into said pipe to operate said float-lifting device, and a locking-lever pivoted to the upwardly-extending arm of said lever and adapted to coöperate with the walls of the trough to hold said drainage-valve in open or closed position, substantially as described.

In witness whereof I have hereunto set my hand in presence of two witnesses.

JOHN J. McCOURT.

Witnesses:
CLYDE NEUMANN,
W. F. BREWSTER.